June 12, 1928.                     A. G. LARSON                     1,673,410
                                LUBRICATING DEVICE
                              Filed Jan. 12, 1927
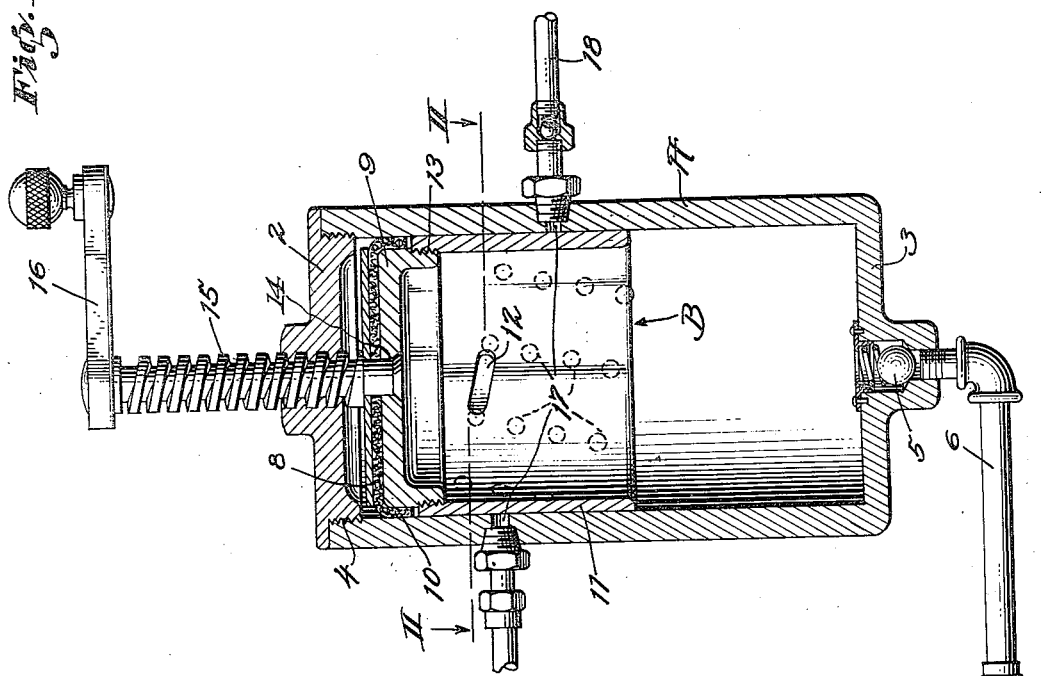
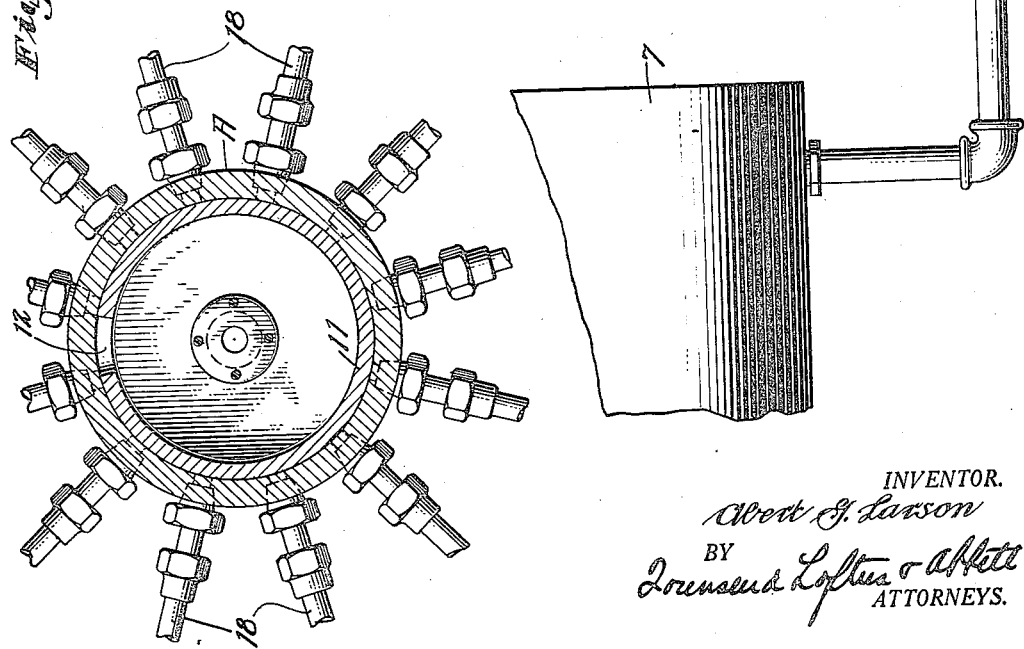
INVENTOR.
Albert G. Larson
BY
Townsend Loftus & Ablett
ATTORNEYS.

Patented June 12, 1928.

1,673,410

UNITED STATES PATENT OFFICE.

ALBERT G. LARSON, OF PIEDMONT, CALIFORNIA, ASSIGNOR OF ONE-HALF TO NESTOR B. LYCKE, OF PIEDMONT, CALIFORNIA.

LUBRICATING DEVICE.

Application filed January 12, 1927. Serial No. 160,546.

This invention relates to a lubricating device and especially that type which permits lubrications of a number of bearings from a single point or source of supply.

The object of the present invention is to generally improve and simplify the construction and operation of lubricating devices of the character described and particularly to provide a lubricator whereby oil, grease or a like lubricant may be placed under high pressure and directed to the bearings to be lubricated.

The invention, briefly stated, employs a cylinder having a plurality of ports formed therein, said ports being interspaced circumferentially of the cylinder and helically arranged, a piston mounted in the cylinder and having a port formed therein, means whereby the cylinder may be filled with a lubricant and means for transmitting endwise and rotary movement to the piston, whereby the piston port is brought into register with the cylindrical ports successively and the lubricant placed under pressure and discharged through the ports. One form which the invention may assume is shown by way of illustration in the accompanying drawings, in which:

Figure 1 is a central vertical section of the lubricating device,

Figure 2 is a cross section taken on the line II—II of Figure 1.

Referring to the drawings, in detail, A indicates a cylinder provided with upper and lower head members, as indicated at 2 and 3, respectively. The head 2 is secured by a threaded connection as indicated at 4 and as such is removable, while the head 3 may be cast integral with the center or secured permanently thereto. Placed in the head member 3 is a check valve of suitable construction, as shown at 5 and connected therewith is the lubricating supply pipe 6, the opposite end of which connects with a reservoir 7 or other suitable source of supply. Mounted within the cylinder is a piston generally indicated at B. This piston consists of an upper head member or plate 8, a lower head member or plate 9 and an intermediate cup-leather 10. The piston is also provided with a skirt or sleeve extension such as shown at 11, in one side of which is formed an elongated port 12. The sleeve 11 may be secured to the head member 9 in any suitable manner or as here illustrated by a threaded connection 13. The piston, as a whole, is rigidly secured as at 14 to the lower end of a screw rod 15 which extends through the head member 2 and has a threaded connection therewith. The upper end of the rod is provided with a crank handle 16 and as the piston is rigidly secured to the rod, rotation of the screw rod by means of the crank 16 will transmit endwise and rotary movement to the piston and the sleeve 11 carried thereby. The cylinder proper is provided with a plurality of discharge ports 17. These are interspaced circumferentially of the cylinder and helically arranged. The helical arrangement or pitch employed is identical to the pitch of the thread employed on the screw rod 15 and the piston port 12 will, accordingly, successively register with the several ports.

The lubricating device illustrated is practically intended for automobiles, for instance, to lubricate shackle-pin bearings, steering knuckles, etc., but it may, of course, be used wherever applicable. If used in an automobile, it may be placed wherever convenient, for instance, under the dash-board or in some other position. The several ports 17 are connected by means of pipes or counter-tubes 18 with the respective bearings or pins to be lubricated, while the pipe 6 is connected with a sub-reservoir such as shown at 7. Each pipe 18 is preferably provided with a check valve 19 which permits oil or grease to be forced outwardly or through the tubes 18, but which will set against reverse movement.

In actual operation, if it is desired to lubricate the bearings, the shackle pins or whatever the case may be, the operator merely transmits a rotary movement to the piston and the sleeve through means of the screw rod and crank 16. Such turning movement places the grease in the cylinder under high pressure and, at the same time, causes the sleeve or piston port 12 to successively register with the discharge ports 17 and the pipes 18. A given amount of grease is thus forced into the pipes and the bearings, as each registration of the ports 12 and 17 is made and practically any number of bearings desired may be lubricated during the downward and rotary movement of the piston. The lubricating device is re-filled by merely reversing the direction of rotation through means of the crank 16. This reverse movement causes the upper piston to travel to the opposite end of the cylinder and the suction supply causes the check-valve 5 to open and the grease or oil to enter, thereby re-filling the lubricating device in readiness for the next operation. Of course, all that the operator needs to take care of is replenishment of the reservoir 7 from time to time.

While certain features of the present invention are more or less specifically described, I wish it understood that various changes may be resorted to within the scope of the appended claims. Similarly that the materials and finishes of the several parts employed may be such as the manufacturer may decide or varying conditions or uses may demand.

Having thus described my invention, what I claim and desire to secure by Letters Patent is:—

1. A device of the character described, comprising a cylinder, said cylinder having a plurality of interspaced ports formed circumferentially thereof and helically arranged, a piston mounted in the cylinder, said piston having a port formed therein, an operating member threaded through the cylinder and connected to the piston to impart a rotary and an endwise movement to the piston so as to bring the piston port successively into register with the cylinder ports.

2. A device of the character described, comprising a cylinder, said cylinder having a plurality of interspaced ports formed circumferentially thereof and helically arranged, a piston mounted in the cylinder, said piston having a port formed therein, an operating member threaded through the cylinder and connected to the piston to impart a rotary and an endwise movement to the piston so as to bring the piston port successively into register with the cylinder ports, a rotary and endwise movement of the piston in one direction causing a discharge of lubricant through the cylinder ports and a reverse rotation and endwise movement of the piston causing a vacuum within the cylinder, a lubricant supply pipe connected with one end of the cylinder, and a check valve therein, said valve opening when a vacuum is placed in the cylinder and closing the same during reverse movement of the piston when a pressure is produced.

3. A device of the character described, comprising a cylinder, said cylinder having a plurality of interspaced ports formed circumferentially thereof and helically arranged, a piston mounted in the cylinder and an elongated extended sleeve on the piston normally forming a closure for all of the cylinder ports, said sleeve having an elongated slot formed in one side thereof, an operating member threaded through the cylinder and connected to the piston to impart a rotary and endwise movement to the piston and the sleeve whereby the elongated port in the sleeve is successively brought into register with the cylinder ports.

4. A device of the character described, comprising a cylinder, said cylinder having a plurality of interspaced ports formed circumferentially thereof and helically arranged, a piston mounted in the cylinder and an elongated extended sleeve on the piston normally forming a closure for all of the cylinder ports, said sleeve having an elongated slot formed in one side thereof, an operating member threaded through the cylinder and connected to the piston to impart a rotary and endwise movement to the piston and the sleeve whereby the elongated port in the sleeve is successively brought into register with the cylinder ports, a pipe connected with each cylinder port, a check valve in each pipe permitting discharge of lubricant through the pipes but providing against reverse movement of lubricant in the pipes, a lubricant supply pipe connected with the cylinder, and a check-valve therein, said check-valve being set when the first-named check-valves are opened and conversely opening when the said first-named check-valves close.

ALBERT G. LARSON.